United States Patent [19]
Peppler et al.

[11] 3,864,290
[45] Feb. 4, 1975

[54] CEMENT SET ACCELERATOR
[75] Inventors: Richard B. Peppler; Philip A. Rosskopf, both of South Euclid, Ohio
[73] Assignee: Martin Marietta Corporation, New York, N.Y.
[22] Filed: Mar. 23, 1973
[21] Appl. No.: 344,149

Related U.S. Application Data
[62] Division of Ser. No. 179,240, Sept. 9, 1971, Pat. No. 3,767,436.

[52] U.S. Cl............... 260/17.5, 106/90, 260/29.4 R
[51] Int. Cl............................................. C08g 37/32
[58] Field of Search......... 260/17.5, 29.4 R, 67.6 R; 106/90

[56] References Cited
UNITED STATES PATENTS

| | | | |
|---|---|---|---|
| 2,501,665 | 3/1950 | Evans et al. | 260/17.3 |
| 2,562,898 | 8/1951 | Evans et al. | 260/17.3 |
| 2,563,898 | 8/1951 | Wilson et al. | 260/29.4 |
| 2,642,405 | 6/1953 | Nielsen | 260/29.4 |
| 2,842,120 | 7/1958 | Foglia et al. | 128/91 |
| 3,381,054 | 4/1968 | Le Blanc et al. | 260/839 |
| 3,406,138 | 10/1968 | Anas et al. | 260/29.4 |
| 3,496,131 | 2/1970 | Bornmann et al. | 260/29.4 |

OTHER PUBLICATIONS
Chem. Abstracts, 55, 10836g (1961).
Chem. Abstracts, 65, 16659d (1966).
Chem. Abstracts, 70, 80694h (1969).

*Primary Examiner*—Melvin Goldstein
*Assistant Examiner*—E. A. Nielsen
*Attorney, Agent, or Firm*—John A. Crowley, Jr.

[57] ABSTRACT

The rate of hardening of a portland cement mix is accelerated by the addition of a low molecular weight, water-soluble hydroxylated adduct formed by reacting melamine and an aldehyde. The adduct is employed in an amount within the range of from about 0.01% to about 1.00%, preferably from about 0.2% to about 0.8% by weight of cement. The water content of the cement mix for a given consistency tends to be lowered by the incorporation of the adduct, providing an additional advantage from the practice of the invention. The adduct may be employed as a concentrated solution in water and may be used in combination with known set accelerating agents and with set retarding agents where reduction in water content is desired without appreciable change in the rate of set of the cement mix.

6 Claims, No Drawings

CEMENT SET ACCELERATOR

This is a division of application Ser. No. 179,240, filed Sept. 9, 1971, now U.S. Pat. No. 3,767,436, issued Oct. 23, 1973.

BACKGROUND OF THE INVENTION

1. Field of the Invention

This invention relates to portland cement mixes. More particularly, it relates to the acceleration of the rate of set of said mixes and improved properties of the hardened concrete.

2. Description of the Prior Art

A variety of techniques have been employed to accelerate the hardening of hydraulic cement mixes. These techniques are employed because of circumstances or conditions that render unduly extended the time required for hardening of such mixes in given applications. The rate of hydration of portland cement is very dependent upon temperature, for example, so that concrete containing it will often harden at a slower rate than desired during the winter season unless provisions are taken to accelerate the hardening process. Among the various techniques employed for this purpose are the increasing of the proportion of portland cement in the mix; the use of the most rapid setting type of cement available; the heating of the water and other components of the concrete; and the use of chemical admixtures that act, catalytically or otherwise, to increase the rate at which the concrete hardens.

A number of chemical agents that serve to accelerate the rate of hardening of concrete are known in the art. Calcium chloride in particular is well known as an effective and economic accelerator. In use, however, this additive is known to have certain disadvantages, principally its tendency to promote corrosion of metal embedded in, or in contact with, the calcium chloride-containing concrete. Other agents, such as alkanolamines, urea and calcium formate, do not promote corrosion of metal, but have a less pronounced effect in accelerating the rate of hardening of concrete.

The rate of hardening of concrete containing portland cement is strongly accelerated by the use of low molecular weight aldehydes and polymers thereof, e.g. paraformaldehyde or Paraform. In aqueous solution, however, such materials evolve esthetically objectionable and toxic fumes. As a result, the quantity of these materials that can be incorporated into concrete for set acceleration purposes without imparting such undesirable fumes to the concrete is very limited.

There is a continuing need in the art, therefore, for improved set accelerating agents. In particular, there is a need for new set accelerating agents capable of rapidly accelerating the rate of set of portland cement mixes. In addition, of course, there is a continuing desire in the art for admixtures capable of permitting other advantages, such as reduction of the water content of the mix and improved compressive strength of the hardened concrete.

It is an object of the present invention, therefore, to provide an improved process for accelerating the hardening of portland cement mixes.

It is another object of the invention to provide a technique for accelerating the rate of hardening of hydraulic cement mixes without undesired corrosive or toxic effects.

It is another object of the invention to provide chemical admixtures for portland cement mixes.

It is a further object of the invention to provide portland cemment mixes having improved properties.

It is a further object of the invention to provide portland cement mixes tending to have reduced water requirements to produce cement mixes of a given consistency.

With these and other objects in mind, the invention is hereinafter set forth in detail, the novel features thereof being pointed out in the appended claims.

SUMMARY OF THE INVENTION

The present invention resides in the incorporation of a low molecular weight, water-soluble hydroxylated adduct of melamine and aldehyde in hydraulic cement mixes comprising portland cement, aggregate and water. The subject adduct can be added in amounts of from about 0.01% to about 1.00%, preferably from about 0.2% to about 0.8%, by weight of cement. Hydraulic cement mixees in which the subject adduct is incorporated also tend to require less water content for a given consistency of mix than is required with such mixes in the absence of an accelerating agent and with such mixes including an additive, e.g. an aldehyde or a urea, for set acceleration purposes.

The invention includes the process for accelerating the rate of set of hydraulic cement mixes and the improved hydraulic cement mix having the subject adduct incorporated therein. In another aspect of the invention, the invention includes novel admixture combinations comprising said melamine-aldehyde adduct and other set accelerating agents, such as water-soluble formates, and, for applications in which water reduction without set acceleration is desired, said melamine-aldehyde adduct and set retarding agents, e.g. calcium lignosulfonate.

DETAILED DESCRIPTION OF THE INVENTION

The present invention permits acceleration of the rate of set of hydraulic cement mixes comprising portland cement, aggregate and sufficient water to effect hydraulic setting of the cement without the corrosive effects associated with the use of calcium chloride and without the evolution of toxic fumes as occurs when conventional aldehyde accelerators are employed. In addition, the acceleration achieved by the adducts of the present invention is accompanied by a limitation on the amount of water required in the cement mix for a given consistency. Thus, the required water content tends to be less than that required for conventional aldehyde accelerators and is frequently less than that required for a given consistency in the cement mixes prepared without the addition of such accelerators.

Water reduction is a highly desirable feature in that the compressive strength of the hardened concrete is increased when reduced quantities of water are utilized in hydraulic cement mixes. It has been found that water reducers, i.e., admixtures that lower the mixing requirements of water for a given mix consistency, often also act as set retarders that slow the chemical process of hydration so that the mix remains plastic and workable for a longer period of time. For this reason, set accelerators are often used together with water reducers in order to overcome the retarding tendency of the water reducer. The accelerator thus increases the rate of hydration for early strength development, while the lower water content of the mix results in an increase in the ultimate compressive strength of the hardened concrete. The ability of the adducts of the present invention to accelerate the rate of set of concrete while, at the same time, tending to reduce or limit the water requirements of the mix provides a valuable flexibility in the art of hydraulic cement mix control. As compared with conventional aldehyde admixtures, the adducts of the invention can be used with lower levels of water content without toxic effect or, alternately, in larger dosages at the same water content level, so as to achieve greater compressive strength, greater acceleration of the rate of hardening, or a desired combination of these effects.

The adducts of the present invention comprise the low molecular weight, water-soluble hydroxylated adducts formed by the reaction of melamine and an aldehyde. While formaldehyde, or paraformaldehyde, is generally preferred, other aldehydes, such as acetaldehyde, may also be employed.

As employed herein, the term "melamime" is meant to include an amino-s-triazine containing at least two $NH_2 -$ groups, preferably melamine or 2,4,6-triamino-sym-triazine, a cyclic trimer of cyanamide.

The melamine-formaldehyde condensates of the invention are prepared, as known in the art, by mixing formaldehyde and melamine under alkaline conditions. The resulting melamine-formaldehyde reduction products, sufficiently unpolymerized to remain water soluble, are available commercially at about 80% water solution, i.e., about 80% by weight solute content based on the weight of solution. For purposes of the present invention, they may also be employed either in dry powder form or as aqueous solutions of a desired concentration.

The adducts of the invention can be employed without corrosive effect or metal embedded in the hardened concrete and without imparting objectionable and toxic fumes to the concrete. As employed to the concrete, therefore, it is not necessary to dilute the concentrated melamine-aldehyde condensate solution to produce an extremely diluted solution as is necessary when employing conventional aldehyde accelerators. A saturated solution of paraformaldehyde having only about 22% solute by weight of solution would, for example, evolve copious, toxic fumes. A concentrated solution of the subject adduct, on the other hand, does not evolve objectionable fumes or odor.

In the practice of the invention, the subject adducts are employed in an amount within the range of from about 0.01% to about 1.00%, preferably from about 0.2% to about 0.8% by weight of cement in the overall mix. It is also within the scope of the invention to incorporate other additives for the purpose for which they are normally employed in conventional mixes in the hydraulic cement mixes containing the adducts of the present invention in the amounts indicated for the purpose of accelerating the rate of set of the concrete and, desirably, limiting the amount of water required for a given consistency. Illustrations of the type of additives that may thus be employed are, for example, air-entraining agents, air detraining agents, pozzuolanic materials, fly ash, coloring materials and water repellents. Other well known additive materials may also be used to accomplish their normal and intended functions.

Among such other additives that may be employed together with the set accelerating adducts of the invention are other known set accelerators. In this aspect of the invention, the combination of accelerators is employed to achieve a rate of hardening that exceeds the acceleration of hardening obtainable by means of the adduct of the invention alone. Water-soluble formates, such as sodium formate, can conveniently be employed for this purpose, the conventional agent being employed, of course, in a dosage sufficient to effect an acceleration of the rate of set. In other aspects of the invention, it may be desired to achieve the water reduction obtainable by the adducts of the invention although the acceleration of the rate of hardening is undesired for a particular application. In this event and also within the scope of the invention, the subject adducts may be employed together with an effective dosage of a known set retarder. The combination of additives thus tends to minimize the required water content, but with a less pronounced effect on the rate of hardening than would result from the use of the adducts alone. If desired, the accelerating effect of the subject adduct can be balanced by the retarding effect of the retarder so the rate of hardening of the overall concrete composition remains essentially unchanged. The lignosulfonates, e.g. calcium, sodium and ammonium lignosulfonates, can advantageously be employed as set retarders in this aspect of the invention.

In the practice of the invention, melamine-formaldehyde adducts were used in hydraulic cement mixes comprising portland cement, aggregate and sufficient water to effect hydraulic setting of the cement. The same type and brand of cement was used in each mix, and the kind and proportion of coarse and fine aggregate employed were likewise substantially the same. The amount of water added in each instance to effect hydraulic setting was such as to produce concrete mixes of essentially the same consistency. The temperature of the concrete in which the adducts were tested was about 50° F. For comparative purposes, the use of the melamine-formaldehyde adduct was compared with the equivalent plain cement mix and with such a mix containing the same percentage addition of a water-soluble, monomeric adduct of urea and formaldehyde having set accelerating properties. The results set forth in the table below represents the average values of duplicate tests. In these tests, melamine-formaldehyde adducts sufficiently unpolymerized to remain soluble were employed in the form of a commercially available water solution having a solute content of 80% by weight of solution.

TABLE

| Mix No. | Additive | Amt. of Additive (% by Wt. of Cement) | Water Content (Gal/Cubic Yd. of Concrete) | Air Vol. % concr. | Rate of Hardening Index, Hrs.* |
|---|---|---|---|---|---|
| 1 | none | — | 35.9 | 1.2 | 9¾ |
| 2 | urea-Formaldehyde Adduct | 0.20 | 34.9 | 1.8 | 7¼ |

TABLE-Continued

| Mix No. | Additive | Amt. of Additive (% by Wt. of Cement) | Water Content (Gal/Cubic Yd. of Concrete) | Air Vol. % concr. | Rate of Hardening Index, Hrs.* |
|---|---|---|---|---|---|
| 3 | Melamine-Formaldehyde Adduct | 0.20 | 31.3 | 5.5 | 6¾ |

*The time referred to is the time that elapsed from the mixing of the concrete before a 30-pound pull is necessary to remove a steel pin of arbitrary dimension from the body of concrete, the development of the steel-concrete bond being proportional to the degree of hardening or settling of the concrete.

The results set forth in the table show that the melamine-formaldehyde adduct of the present invention has a very significant effect in accelerating the rate of hardening of the concrete, providing for an appreciable reduction in the time required for set as compared with the time required for set when the same dosage of a urea adduct having desirable set accelerating properties was employed. Both additives were non-toxic and non-corrosive in nature. In addition, the use of the melamine-formaldehyde adduct resulted in a very considerable reduction in water content as compared with the plain mix containing no set accelerator, i.e., 31.3 gal/cubic yd. as compared with 35.9 gal/cubic yd. The urea adduct, by comparison, produced a favorable reduction in water content compared with the plain mix, reducing the water content to 34.9 gal/cubic yd., but considerably less reduction than was achieved with the adduct of the present invention. As previously indicated, it is often found necessary to incorporate a set retarding admixture in the cement mix to achieve water reduction, with an accelerator being required in addition to overcome the retarding tendency of the water reducer. The subject adduct, on the other hand, advantageously combines its set acceleration properties with a strong tendency to limit or reduce the water requirements of the mix.

The incorporation of relatively small amounts of the water-soluble melamine-aldehyde adducts of the invention thus result in an advantageous increase in the rate of hardening of hydraulic cement mixes without corrosive effects and the undesired evolution of toxic fumes that accompany the use of formaldehyde and polymers thereof in the absence of precautionary dilution. Hydraulic cement mixes having the subject adducts therein also tend to have a limited water content requirement for a given consistency providing further desirable benefits with regard to the hardened concrete. Because of the ability of the subject adducts to operate effectively in combination with known set retarders and set accelerating agents to provide a desired combination of beneficial effects, a further advantageous embodiment of the invention resides in admixture combinations of the subject adducts and such known set retarding and set accelerating agents. In such admixture of additive compositions, the relative amounts of the subject adducts and of the conventional agents may be, as will be appreciated in the art, subject to wide variation depending upon the particular additive or balancing effects desired in any given applications. It will be recognized that the additive compositions can be added, together or separately, in dry powder form or in liquid mixtures of any desired concentration. The present invention, in all of its embodiments, represents a significant and commercially useful advance in the art of controlling the hardening of cement. As such, the invention provides a valuable flexibility to facilitate the control of cement for particular applications and operating conditions.

I claim:

1. A hydraulic cement mix additive comprising a mixture of (a) a water soluble adduct product resulting from the condensation reaction of 2,4,6-triamino-sym-triazine with an aldehyde under alkaline conditions and (b) an agent adapted to affect the rate of setting of concrete which agent is a lignosulfonate of calcium, sodium or ammonium or a water soluble formate salt, whereby upon incorporating said additive in the hydraulic cement mix of portland cement, aggregate and sufficient water to effect hydraulic setting of the cement, the rate of hardening of said cement mix is advantageously controlled while the amount of water required in the mix for a given consistency is considerably reduced as compared with a plain mix, and without undesired toxic or corrosive effects.

2. The cement mix additive of claim 1 in which said aldehyde comprises formaldehyde.

3. The cement mix additive of claim 1 in which said agent adapted to affect the rate of setting is a lignosulfonate of calcium, sodium or ammonium, whereby the rate of hardening of cement mixes containing said additive is less than that resulting from the use of the adduct alone as an additive.

4. The cement mix additive of claim 3 in which said agent is calcium lignosulfonate.

5. The cement mix additive of claim 1 in which said agent adapted to affect the rate of setting is a water soluble formate salt, whereby the rate of hardening of cement mixes containing said additive is advantageously accelerated in excess of the acceleration obtainable by means of the adduct alone.

6. The cement mix additive of claim 5 in which said water soluble formate salt is sodium formate.

* * * * *

UNITED STATES PATENT OFFICE
CERTIFICATE OF CORRECTION

Patent No. 3,864,290   Dated February 4, 1975

Inventor(s) Richard B. Peppler; Phillip A. Rosskopf

It is certified that error appears in the above-identified patent and that said Letters Patent are hereby corrected as shown below:

In Column 2, line 1, after "provide" the following word was omitted:
---improved---

In Column 2, line 4, the word "cemment" should be ---cement---

In Column 2, line 21, the word "mixees" should be ---mixes---

In Column 3, line 22, the word "melamime" should be ---melamine---

In Column 3, line 38, the word "or" should be ---on---

In Column 5, line 56, the word "of" before "additive" should be ---or---

Signed and sealed this 22nd day of April 1975.

(SEAL)
Attest:

RUTH C. MASON
Attesting Officer

C. MARSHALL DANN
Commissioner of Patents
and Trademarks